(No Model.) 2 Sheets—Sheet 1.

A. & J. H. McLEOD.
AUTOMATIC GRAIN WEIGHER.

No. 587,680. Patented Aug. 3, 1897.

WITNESSES
W. A. Schoenborn.
J. M. Mason

INVENTORS,
Angus McLeod.
John H. McLeod.
by John Wedderburn
Attorney (No Model.) 2 Sheets—Sheet 2.

A. & J. H. McLEOD.
AUTOMATIC GRAIN WEIGHER.

No. 587,680. Patented Aug. 3, 1897.

WITNESSES
W. A. Schomborw.
J. M. Mason.

INVENTOR.
Angus McLeod,
John H. McLeod,
by John Wedderburn
Attorney

UNITED STATES PATENT OFFICE.

ANGUS McLEOD AND JOHN H. McLEOD, OF MARIETTA, KANSAS.

AUTOMATIC GRAIN-WEIGHER.

SPECIFICATION forming part of Letters Patent No. 587,680, dated August 3, 1897.

Application filed August 1, 1896. Serial No. 601,359. (No model.)

*To all whom it may concern:*

Be it known that we, ANGUS McLEOD and JOHN H. McLEOD, citizens of the United States, residing at Marietta, in the county of Marshall and State of Kansas, have invented certain new and useful Improvements in Automatic Grain-Weighers; and we do hereby declare the following to be a full, clear, and exact description of the invention, such as will enable others skilled in the art to which it appertains to make and use the same.

Our invention relates to automatic grain-meters.

Our object is to provide an improved grain-meter which will be adapted to automatically weigh grain as the same is discharged therein and which can be adjusted to weigh any desired quantity.

A further object is to provide a novel automatic grain meter or weigher which will be of such improved construction that it will be adapted to remain in discharging position until all the grain has passed out, and will be so nicely adjusted that it will respond immediately upon the proper weight of the grain being received in the bucket.

Having these objects in view, our invention consists of an automatic grain meter or weigher comprising those improved features and novel combinations appearing more fully in detail in the following description and appended claims, as well as in the accompanying drawings, in which—

Figures 1, 2:
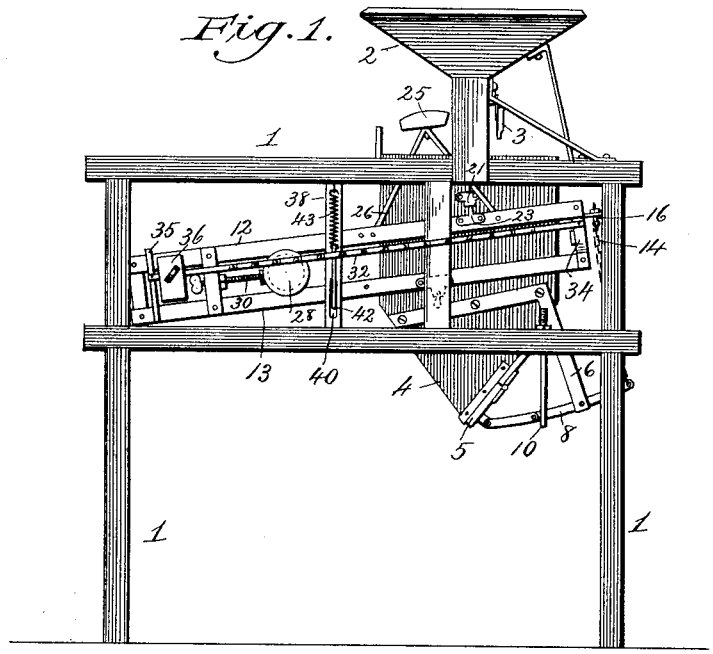
Figure 3:
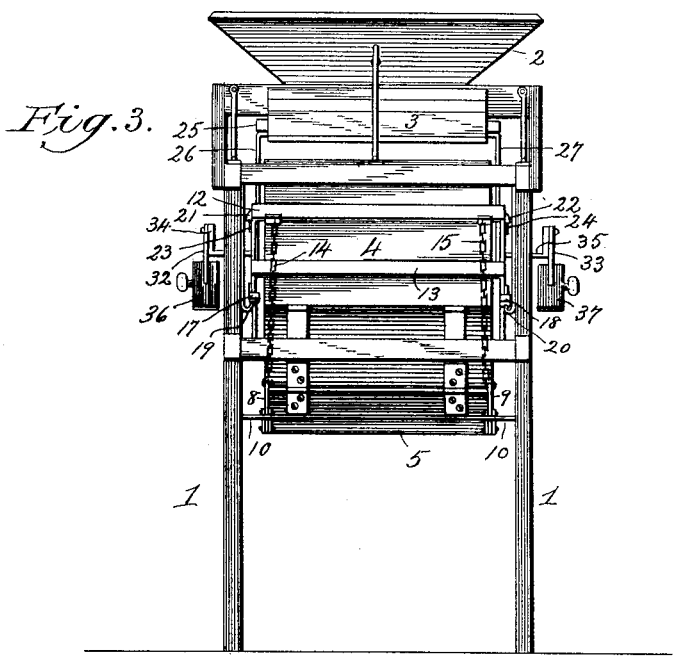
Figure 4:
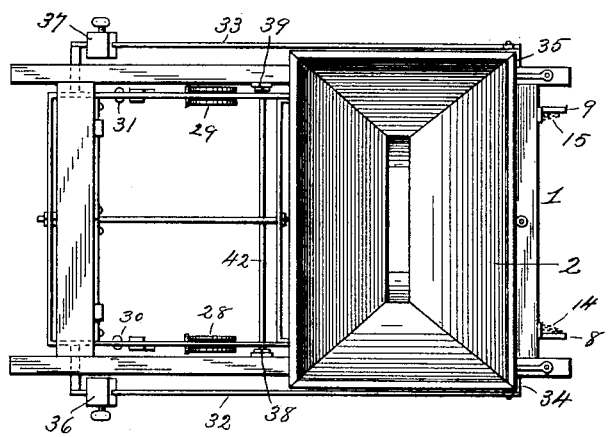

Figure 1 is a side elevation; Fig. 2, a longitudinal sectional view; Fig. 3, an end elevation, and Fig. 4 a plan view.

The numeral 1 designates the framework of our improved grain-meter, which in the present instance is made substantially rectangular in shape. This frame can be connected to any preferred form of support in position to properly receive the grain.

The numeral 2 designates a receiving-hopper of ordinary construction, which is adapted to discharge downwardly. This hopper extends across the frame and is provided with a depending flexible flap 3.

Our improved grain-bucket is designated by the numeral 4, being of the shape ordinarily employed, and which has a gate 5 at its lower end, said gate being hinged to the inclined side of the bucket. The grain-bucket is located immediately below the discharge-mouth of the hopper, so as to be adapted to readily receive the grain therefrom. Brackets 6 and 7 depend downwardly from the grain-bucket, and at 8 and 9 are shown toggle-levers, which have one of their members connected to the gain and the other member pivoted to the bracket.

The numeral 10 designates a trip-bracket which extends across the frame from side to side, being located beneath the toggle-levers and adapted to break the knees thereof when the grain-bucket descends.

At 11 is shown a rectangular bucket-frame which is composed of upper and lower rectangular bands 12 and 13.

The numerals 14 and 15 designate chains which are adjustably connected to the upper band or strip of the rectangular frame by means of bolts 16 and 17 and have their lower ends connected to the other ends of the outer members of the toggle-levers. The object of these chains is to strengthen or lock the toggle-levers when the bucket ascends after the grain has been discharged. The lower bands of the rectangular bucket-frame are provided with inverted bearing-cups 17 and 18, while 19 and 20 designate upwardly-turned hooks, which are connected to the main frame of the machine and project into said cups, so that the frame is free to rock up and down. Additional inverted bearing-cups 21 and 22 are connected to the sides of the bucket, and upwardly-turned hooks 23 and 24 are connected to the upper bands of the bucket-frame and are in engagement so that the bucket itself can swing laterally in relation to its frame.

The numeral 25 designates a curved transversely-extending cut-off slide which is adapted to close the spout of the hopper, said cut-off being supported from the upper band of the bucket-frame by standards 26 and 27. Thus it will be seen that when the longer end of the bucket-frame rocks upwardly on its pivots when the bucket is descending to discharge its load the cut-off will close the mouth of the delivery-hopper and prevent more grain from being fed therethrough.

At 28 and 29 are shown peripherally-grooved wheels or disks which run between the side portions of the upper and lower bands of the bucket-frame. When the bucket descends with its load of grain, these disks roll toward and past the bucket to the end of the frame of the latter and tend to keep said bucket down until it has discharged all of its grain. When the bucket ascends, the longer end of the frame thereof is depressed and the disks roll back again. At 30 and 31 are shown adjusting-screws for regulating the rearward movement of these disks.

When the mechanisms to be described later on have been adjusted to cause the bucket to operate at a greater or less weight, these adjusting-screws must also be manipulated so that the initial positions of the disks will be thrown farther back or forward to compensate for the change.

At 32 and 33 are shown graduated bars which extend parallel to the sides of the bucket-frame and are connected thereto by sets of brackets 34 and 35, respectively.

The numerals 36 and 37 designate weights which are adjustable on said bars or beams. By moving these weights the hopper can be made to descend and discharge when any desired weight of grain has been received therein.

The numerals 38 and 39 designate vertically-extending bars which are provided with guide-slots 40 and 41, respectively, these bars being connected to the stationary main frame.

The numeral 42 designates a lifting-bracket whose cross-pieces extend transversely of the main frame and which is slidable in the vertical guide-slots.

At 43 and 44 are shown closed coil-springs which have their lower ends connected to the upper portion of the main frame. Hence a spring-tension is constantly being exerted on the lifting-bracket, so that the bucket-frame is assisted to rise immediately upon the exact amount of grain being introduced into the hopper. Furthermore, this lifting-bracket insures the downward movement of the frame after the bucket has again ascended. This lifting-bracket rises until the discharge of grain from the hopper is checked to a "dribble." The bracket has then reached the limit of its upward movement, and the hopper begins to descend, so that the weighing operation is extremely accurate. Should there be any grain left in the bucket after the weighing operation has been completed, this extra grain can be weighed off by adjusting the weights on the graduated bars or beams.

The operation is as follows: After the requisite amount of grain has been received in the bucket the latter begins to descend and is assisted by the lifting-bracket. Immediately after the bucket-frame has passed a horizontal position the rollers or disks roll down toward the front of the machine and the joints of the toggle-levers are broken, so that the gate of the bucket is opened and the grain begins to pass out over the latter, the bucket being held down by means of the rollers until the grain has completely passed out. The weights now cause the bucket to rise and the rollers to move back to their initial positions, while the chains again lock the toggle-joints and close the gate. It will be observed that while the bucket is in descended position the cut-off is closing the hopper-mouth.

It is obvious that many slight and immaterial changes of construction might be resorted to without detracting from any of the advantages of our invention, and hence it is to be understood that we do not limit ourselves to the precise construction herein shown and described, but consider that we are entitled to all such variations as come within the spirit and scope of our invention.

Having thus described our invention, what we claim as new, and desire to secure by Letters Patent, is—

1. In a grain-meter, the combination with a pivoted and weighted bucket-frame, of a grain-bucket pivoted to the frame, a gate for said bucket, a toggle-lever having one of its members connected to the gate and its other member pivoted to the bucket, a flexible connection between the pivoted member and the bucket-frame, and a bracket for breaking the knee of the toggle-lever when the bucket descends.

2. In a grain-meter, the combination with a pivoted bucket-frame, of a grain-bucket connected thereto, a weight for the frame, bars provided with guide-slots, a spring having one end fixed, and a lifting-bracket which is slidable in the slots and to which the other ends of the springs are connected, said lifting-bracket engaging with the frame and being adapted to assist the same in rising when the bucket descends to discharge its grain.

3. In a grain-meter, the combination with a pivoted bucket-frame, of adjustable weights therefor, rollers movable in the frame and adapted to shift their positions when the same is raised or lowered, a grain-bucket pivoted to the frame, cut-off mechanism, a gate for said bucket, a toggle-lever having one member connected to the gate and the other member pivoted to the bucket, a connection between the pivoted member of the toggle-lever and the bucket-frame, and means for breaking the knee of the toggle-lever.

In testimony whereof we have signed this specification in the presence of two subscribing witnesses.

ANGUS McLEOD.
JOHN H. McLEOD.

Witnesses:
M. C. BRAINARD,
W. G. HUNTER.